United States Patent Office 3,078,225
Patented Feb. 19, 1963

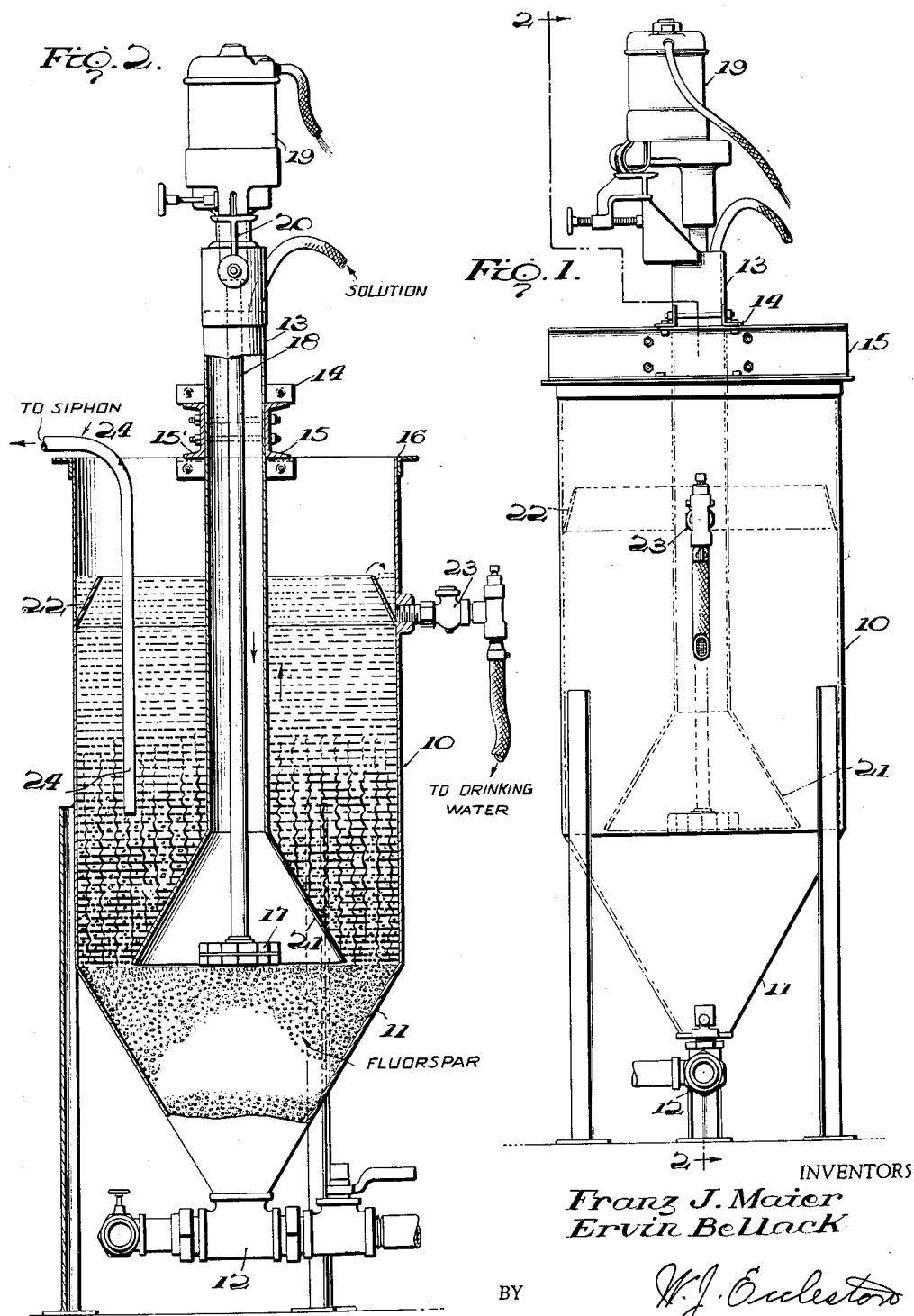

3,078,225
FLUORIDATION OF DRINKING WATER
Franz J. Maier, Chevy Chase, and Ervin Bellack, Bethesda, Md., assignors to the United States of America as represented by the Secretary of the Army and the Secretary of Health, Education and Welfare
Continuation of application Ser. No. 693,216, Oct. 29, 1957. This application Nov. 12, 1959, Ser. No. 852,581
2 Claims. (Cl. 210—47)
(Granted under Title 35, U.S. Code (1952), sec. 266)

The invention described herein, if patented, may be manufactured and used by or for the Government for governmental purposes, without the payment to us of any royalty thereon. This application is a continuation of our copending application Serial No. 693,216, filed October 29, 1957, now abandoned.

This invention relates to a process and apparatus for the fluoridation of drinking water, and more particularly to a system which utilizes an aqueous solution of a reaction product of fluorspar and of a water-soluble coagulant metal salt, e.g., alum( aluminum sulfate), for the simultaneous fluoridation of drinking water and coagulation of the impurities contained therein.

Fluoridated drinking water is used in many communities for the purpose of supplying a sufficient amount of fluoride ions to the diet to meet dental health standards. Water-soluble fluoride compounds are not an abundant natural product, and synthetic water-soluble fluorides are not inexpensive. Thus, sodium fluoride, which is a water-soluble fluoride now frequently used in the fluoridation of water, costs about 14 cents per pound. Assuming that 20 pounds of sodium fluoride are needed to fluoridate 1,000,000 gallons of drinking water, the cost of fluoridation of drinking water with sodium fluoride is $2.80 per 1,000,000 gallons.

A standard purification treatment for drinking water comprises the addition of controlled amounts of filter alum (commercial aluminum sulfate), which effects the coagulation of impurities through the action of the aluminum ions of the alum.

Fluorspar, which contains calcium fluoride or fluorite ($CaF_2$) in natural form, is an industrial chemical which in concentrated form contains about 85–98% calcium fluoride. It is water-insoluble and therefore cannot be used as such for the fluoridation of drinking water. Commercial fluorspar costs about $40.00 per ton (about 2 cents per pound) and would require about 18 pounds to fluoridate a million gallons of water.

We have found that simultaneous fluoridation and coagulation of drinking water can be effected economically and efficiently by departing from the conventional method of supplying separate quantities of fluoride and aluminum ions to the water. In accordance with our invention, a water-soluble reaction product is formed by contacting finely divided fluorspar with an aqueous solution of aluminum sulfate (alum). This reaction product is a complex which contains aluminum ions and fluoride ions. This water-soluble reaction product is supplied to the drinking water in the form of an aqueous solution and in an amount to supply enough fluoride ions to the drinking water by supplementing the natural fluoride ion contents, if any, of the drinking water, so as to obtain the optimum fluoride ion concentration in accordance with applicable dental health standards. The aluminum ions of the aforementioned reaction product simultaneously effect the coagulation of impurities contained in the drinking water supplied. While local fluoridation standards will vary, we have found that on the average, 100 pounds of fluorspar is a sufficient amount of starting material to provide a reaction product adequate for the fluoridation of 5,000,000 to 6,000,000 gallons of drinking water. Thus, at an average price of $40.00 per ton of fluorspar (or about $2.00 per 100 pounds), the material cost for the fluoridation of 1,000,000 gallons of drinking water is approximately 36 cents, or about one-third of the cost of fluoridation with sodium silicofluoride and one-eighth the cost using sodium fluoride. The material cost of the alum needed to effect the solubilization of the fluorospar need not be computed separately in this connection because a corresponding amount of alum would have to be supplied to the drinking water in any event for coagulation of impurities.

As pointed out, the chemical reaction between the fluorspar and alum (aluminum sulfate) results in the formation of a water-soluble complex which contains aluminum ions and fluoride ions, presumably aluminum fluosulfate ($AlFSO_4$), accompanied by the formation of a water-insoluble by-product, calcium sulfate ($CaSO_4$). We presume that the reaction proceeds along the general line:

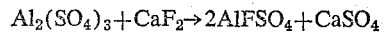

$$Al_2(SO_4)_3 + CaF_2 \rightarrow 2AlFSO_4 + CaSO_4$$

however, we wish it to be understood that the practice of our invention is not predicated on the precise contents of the foregoing formula.

The reaction outlined above should not be construed to limit the use of chemicals for dissolving fluorspar to aluminum sulfate alone. Fluorspar can be dissolved in solutions of other chemicals used on water treatment so that the fluoride ion is produced from fluorspar by the production of water-soluble fluoride complexes. For example, ferric chloride and aluminum chloride produce soluble complexes yielding fluoride ions in solution. In addition other compounds used in water treatment such as aluminum-ammonium sulfate, aluminum potassium sulfate, chlorinated copper as (chlorinated ferrous sulfate), ferric sulfate, ferrous sulfate, and sodium aluminate may readily be used for this purpose. Mixtures of the foregoing metal salts with alum and/or with each other are of course also suitable for carrying out the purposes of our invention.

In order to increase the efficiency of the reaction, we have devised a dissolving tank, illustrated in the accompanying drawings. We wish it to be understood, however, that the practice of our invention is not necessarily limited to the use of this particular tank, even though we are presently not aware of any other commercially available apparatus which will work with equal or greater efficiency in our system. We further wish it to be understood that the dimensions of the tank may be readily altered (increased or decreased) to accommodate larger or smaller drinking water systems, if desired.

In the accompanying drawings,
FIGURE 1 shows, in front elevation, and
FIGURE 2 shows, partly in section and partly in side elevation, a dissolving tank in accordance with our invention.

In the drawing, 10 denotes a ground-supported stainless steel tank having a liquid capacity of about 75 gallons. The bottom portion 11 of the tank is preferably generally cone-shaped and is provided with a T-fitting, 12, which is used as a clean-out. This bottom portion 11 constitutes a well for the reception of comminuted fluorspar. A vertical open pipe 13 extends into the well portion of tank 10 for the admission of an aqueous solution of alum at a controlled rate. Optionally, this pipe may be provided with height adjustment means, such as a collar 14, which in turn is bolted or otherwise connected to a pair of channel irons 15, 15'. Collar 14 may be provided with set-screws or other adjustable means, so that the height of pipe 13 may be adjusted to the desired distance from the bottom of the cone of tank 10. Channel irons 15, 15' are shown in the drawing affixed to the upper edge 16 of cylindrical tank 10; however, they may instead be provided with independent ground-supporting means, or fastened to a wall or ceiling.

Associated with pipe 13 is an agitator or stirrer 17 of commercial design, e.g., a 6 inch diameter stainless steel flat-bladed rotary turbine impeller. In the model shown, the agitator is rotated by means of vertical shaft 18 which extends through pipe 13; a motor 19, e.g., a ¼-h.p. electric motor rotates shaft 18 and may be mounted on pipe 13 by means of a bracket 20 (or may be independently supported). Process efficiency demands that stirrer 17 be located proximate to the lower mouth of pipe 13. For maximum efficiency we have provided the lower mouth of pipe 13 with a flared section 21, preferably of conical shape resembling a funnel (a bell shape or other configuration encompassing the impeller, also being acceptable), and have located the stirrer 17 within or slightly below the widened portion of flare 21. Stirrer 17 is located at that position to promote the maximum reaction between the fluorspar and alum solution at their point of initial contact.

At the upper portion of tank 10, vertically spaced from its upper end, there is provided an annular weir 22, e.g., in the shape of a truncated cone segment or frustocone whose base has a diameter corresponding to the inner diameter of tank 10. Their weir 22 collects the aqueous solution of the water-soluble reaction product produced at the site of agitator 17 and in the fluorspar bed. This aqueous solution of the reaction product is supplied in controlled amounts to the drinking water reservoir through outlet 23. As shown diagrammatically in FIGURE 2 of the drawings, the space between the surface of the fluorspar bed and the rim of weir 22 is filled during the process of the reaction with an upwardly moving liquid. This aqueous solution contains aluminum ions and fluoride ions together with the complex formed as a result of the reaction. In addition there are suspended in the liquid the unreacted solid particles of fluorspar and a by-product sludge containing calcium sulfate. However, these particles do not rise to the level of the upper rim of weir 22; only the clear liquid flows into the weir.

The calcium sulfate sludge which builds up above the surface of the fluorspar bed is removed continuously or intermittently by appropriate means, e.g., by siphoning through a suction line 24 extending into the tank through its open upper end.

In accordance with a modification of our invention as above-described, the siphon and suction line 24 are omitted, and the constantly forming calcium sulfate sludge is removed from the tank by increasing the withdrawal rate of the solution of the reaction product so that the upward velocity of liquid within the tank is sufficient to produce a hydraulic separation of the sludge from the unreacted fluorspar. By this means, the sludge is carried into the flocculation basin of the water treatment plant along with the solution of the reaction products. This sludge then adds to the turbidity of the untreated, incoming water and thereby assists in its coagulation by providing additional nuclei for the formation of floc. The particles of sludge introduced in this manner are subsequently removed from the water by settling or filtration. Certain obvious design changes in the construction of dissolving tank 10, to accomplish the simultaneous withdrawal of the calcium sulfate sludge together with the aqueous solution of the fluoride-ion containing reaction product, may be made, but are not illustrated.

The fluorspar consumed in the reaction is replenished through the top of tank 10. The rate of the reaction is adjusted by feeding appropriate amounts and concentrations of aluminum sulfate (alum) in the form of an aqueous solution through pipe 13. This rate of supply and concentration can be determined through relatively simple stoichiometrical computations. Fitting 12 is used for periodic removal of solid impurities which drop through the fluorspar bed into well 11; these impurities are principally those contained in the fluorspar supply itself, which impurities settle out as the reaction proceeds.

In an actual run in the apparatus described, 300 pounds of comminuted fluorspar of about 97% purity, were placed into the dissolving tank containing the alum solution approximately to the upper level of conical well section 11, and a solution of 50 pounds of alum (aluminum sulfate) in 50 gallons of water corresponding to a solution strength of about 11% was gradually and accurately proportioned into the tank through the vertical pipe 13. With the agitator running, the alum solution reacted with the fluorspar and a water solution of the aluminum-ion- and fluoride-ion-containing water-soluble reaction product (presumably aluminum fluosulfate or analogous fluoride-aluminum complex) ascended above the fluorspar bed. The liquid collected in the weir above the fluorspar bed was fed into the water reservoir at a maximum desirable rate of 555 ml. per minute for the tank shown. The feed of alum into the dissolving tank described was adjusted to maintain a substantially constant level of reaction-product solution in the weir. A moist sludge of water-insoluble by-product (presumably calcium sulfate) accumulated below the weir, and was withdrawn at the time of fluorspar replenishment through the top of the tank by means of suction line 24 and siphon. The fluorspar used up in the reaction was replenished from time to time in 100 lb. increments through the top of the tank substantially immediately after the withdrawal of sludge. It was found that at the foregoing rates of supply, 100 lbs. of fluorspar was sufficient to furnish a reaction product for the fluoridation of 6,000,000 gallons of water at a concentration of 1.0 mg./l. of fluoride.

It is obvious that adjustments can be made in the foregoing procedure, e.g., by increasing the rate of withdrawal of the liquid solution of the water-soluble reaction product and simultaneous increase in the rate of supply of alum solution and for adjustment of the range of concentration of the alum solution, e.g., within the solubility range of aluminum sulfate. However, a stoichiometric excess of fluorspar should generally be maintained for process efficiency.

Likewise, if it should be found in actual operation that the amount of aluminum ions supplied to the drinking water by means of the feed of the water solution of the reaction product is insufficient to coagulate the impurities contained in the drinking water, additional alum can be fed into the water supply, e.g., by a separate feeder.

As pointed out, the size and relative proportions of the tank are for purposes of illustration only and may be varied within broad limits without departing from our invention.

It will thus be seen that we have provided a system of simultaneous fluoridation and coagulation of impurities in drinking water by the use of inexpensive inorganic chemicals, and without the need for complicated machinery.

Although we have illustrated and described the preferred form of our invention, it will be obvious that various changes may be made therein without departing from the spirit of the invention or from the scope of the subjoined claims.

We claim:

1. A continuous process for fluoridation of drinking water, comprising:
   continuously feeding and stirring an aqueous solution of an aluminum sulfate salt into a bed of comminuted fluorspar, whereby a water-soluble reaction product containing aluminum ions and fluoride ions is formed as an aqueous solution, and a substantially water-insoluble calcium sulfate sludge is formed as a by-product;
   continuously supplying measured amounts of said aluminum ions and fluoride ions containing aqueous solution of said reaction product together with calcium sulfate sludge by-product to a supply of drinking water, said amounts being adequate to provide sufficient fluoride ions to meet dental health standards and to provide at least part of the aluminum ions necessary to effect coagulation of the impurities in said drinking water, and said calcium sulfate sludge assisting in the purification of said drinking water by flocculation of the impurities contained in said drinking water;

and replenishing said fluorspar bed with a fresh supply of comminuted fluorspar to replace reacted fluorspar.

2. Process according to claim 1, wherein said calcium sulfate sludge is hydraulically separated from said fluorspar by the flow of said last-named aqueous solution.

References Cited in the file of this patent
UNITED STATES PATENTS

| | | |
|---|---|---|
| 1,672,584 | Travers | June 5, 1928 |
| 1,715,877 | Travers | June 4, 1929 |
| 2,348,123 | Green et al. | May 2, 1944 |
| 2,364,023 | Green | Nov. 28, 1944 |
| 2,425,371 | Green | Aug. 12, 1947 |
| 2,429,315 | Green | Oct. 21, 1947 |
| 2,643,226 | White | June 23, 1953 |
| 2,678,915 | Kalinske | May 18, 1954 |

OTHER REFERENCES

Water and Sewage Works (periodical), vol. 97, No. 4, April 1950, pages 143–145.